(12) United States Patent
Lee et al.

(10) Patent No.: US 12,498,393 B2
(45) Date of Patent: Dec. 16, 2025

(54) SENSOR DATA ACQUISITION METHOD AND DEVICES

(71) Applicant: SAMSUNG ELECTRONICS CO., LTD., Suwon-si (KR)

(72) Inventors: Sungchull Lee, Suwon-si (KR); Jaeil Kim, Suwon-si (KR); Geunyoung Choi, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 312 days.

(21) Appl. No.: 18/094,569

(22) Filed: Jan. 9, 2023

(65) Prior Publication Data

US 2023/0160923 A1  May 25, 2023

Related U.S. Application Data

(63) Continuation of application No. PCT/KR2022/013678, filed on Sep. 14, 2022.

(30) Foreign Application Priority Data

Nov. 5, 2021 (KR) .................. 10-2021-0151688
Jan. 4, 2022 (KR) .................. 10-2022-0001072

(51) Int. Cl.
*G01P 21/00* (2006.01)
*G01P 1/07* (2006.01)

(52) U.S. Cl.
CPC ............... *G01P 21/00* (2013.01); *G01P 1/07* (2013.01)

(58) Field of Classification Search
CPC ........... G01P 21/00; G01P 1/07; G01D 21/02; A61B 5/0024; A61B 5/02055; A61B 5/11;
(Continued)

(56) References Cited

U.S. PATENT DOCUMENTS 5,850,538 A * 12/1998 Steinman ............... G06F 30/20
  703/21
10,571,999 B2   2/2020 Tanaka et al.
(Continued)

FOREIGN PATENT DOCUMENTS

JP    2006247386 A    9/2006
JP    2013544545 A    12/2013
(Continued)

OTHER PUBLICATIONS

International Search Report with English Translation and Written Opinion for International Application No. PCT/KR2022/013678; International Filing Date Sep. 14, 2022; Date of Mailing Dec. 16, 2022; 3 pages.

*Primary Examiner* — Lisa M Caputo
*Assistant Examiner* — Cynthia L Davis
(74) *Attorney, Agent, or Firm* — CANTOR COLBURN LLP

(57) ABSTRACT

A sensor data acquisition method using a plurality of electronic devices includes receiving sample sensor data from each of the electronic devices for each predetermined period; generating reference data based on the sample sensor data; calculating a measurement accuracy of each of the electronic devices for each predetermined period based on at least one of the sample sensor data or the reference data; determining priority information of each of the electronic devices for each predetermined period based on at least one of the measurement accuracy or state information of each of the electronic devices; determining a measurement-activated electronic device and a measurement-deactivated electronic device based on the priority information; receiving sensor data from the measurement-activated electronic device for a time unit of a predetermined period; and determining whether to change the measurement-activated electronic (Continued)

device to another electronic device based on the priority information updated in each predetermined period.

15 Claims, 10 Drawing Sheets

(58) Field of Classification Search
CPC .... A61B 5/7203; A61B 5/7221; A61B 5/7246
See application file for complete search history.

(56) References Cited

U.S. PATENT DOCUMENTS

| | | | |
|---|---|---|---|
| 2006/0017449 A1* | 1/2006 | Takekawa | G01D 5/24 |
| | | | 324/683 |
| 2007/0091803 A1* | 4/2007 | Ma | H04L 41/0896 |
| | | | 370/230 |
| 2007/0169538 A1* | 7/2007 | Kleefstra | G01D 3/08 |
| | | | 73/1.88 |
| 2009/0069642 A1 | 3/2009 | Gao et al. | |
| 2017/0010658 A1* | 1/2017 | Tanaka | G06F 1/1698 |
| 2017/0272902 A1* | 9/2017 | Safonov | G01P 21/00 |
| 2018/0136180 A1* | 5/2018 | Chou | G01N 33/0036 |
| 2019/0353502 A1* | 11/2019 | Doshi | G01D 21/00 |
| 2023/0175865 A1* | 6/2023 | Zorgui | G01P 15/18 |
| | | | 702/94 |

FOREIGN PATENT DOCUMENTS

| | | |
|---|---|---|
| JP | 6314343 B2 | 4/2018 |
| JP | 6585606 B2 | 10/2019 |
| KR | 20110042811 A | 4/2011 |
| KR | 20140086426 A | 7/2014 |
| KR | 101618301 B1 | 5/2016 |
| KR | 20160096926 A | 8/2016 |
| KR | 101674997 B1 | 11/2016 |
| KR | 101691142 B1 | 1/2017 |
| KR | 20170024436 A | 3/2017 |
| KR | 101809131 B1 | 12/2017 |
| KR | 101967342 B1 | 4/2019 |
| KR | 102060909 B1 | 12/2019 |
| KR | 102130814 B1 | 7/2020 |
| KR | 102254164 B1 | 5/2021 |
| KR | 102271432 B1 | 7/2021 |
| KR | 20210105720 A | 8/2021 |
| WO | 2006120600 A1 | 11/2006 |
| WO | WO-2023057044 A1 * | 4/2023 ............ G07C 5/008 |

* cited by examiner

SENSOR DATA ACQUISITION METHOD AND DEVICES

CROSS-REFERENCE TO RELATED APPLICATIONS

This application is a continuation application of International Application No. PCT/KR2022/013678 designating the United States, filed on Sep. 14, 2022, in the Korean Intellectual Property Receiving Office and claiming priority to Korean Patent Application No. 10-2022-0001072, filed on Jan. 4, 2022, and Korean Patent Application No. 10-2021-0151688, filed on Nov. 5, 2021, in the Korean Intellectual Property Office, the disclosures of which are incorporated by reference herein in their entireties.

BACKGROUND

1. Field

The disclosure relates to sensor data acquisition method and devices.

2. Description of Related Art

A wearable device refers to an electronic device provided in a wearable form, such as, for example, (eye)glasses, a watch, a ring, and clothes. The wearable device may be provided for the ultimate purpose of allowing a user to wear it on part of their body without making the user experience a sense of reluctance and of supplementing or doubling human capabilities. The advancement in wearable device-related technologies has been accelerating the development of various wearable devices that may be worn around or on various body parts of users. In addition, various sensors may be attached to these wearable devices to collect various pieces of biometric information of users. Accordingly, various types of wearable devices may be attached to multiple body parts to be used to acquire various types of biometric information of a user.

SUMMARY

As sensors for acquiring biometric information are added to various wearable devices, a user may wear one or more wearable devices at the same time. In this case, some pieces of data acquired through health monitoring may be duplicated, which may make it hard to decide which one of the pieces of biometric information is the most accurate. The biometric information received from these various types of wearable devices may have different accuracy levels according to the hardware performance or attachment state of each wearable device being attached to the body of a user. Accordingly, there is a growing interest in a technology for receiving highly accurate biometric information from a plurality of wearable devices.

According to various example embodiments described herein, it is possible to periodically collect measurement data from the same sensors in different wearable electronic devices, and activate only one wearable electronic device (or sensor) having the highest accuracy among the electronic devices.

According to various example embodiments described herein, it is possible to prevent unnecessary duplicate measurement data from being generated and a user from being confused by duplicate alarms.

However, technical aspects of the present disclosure are not limited to the foregoing aspects, and other technical aspects may also be present. Additional aspects of the disclosure will be set forth in part in the description which follows and, in part, will be apparent from the description, or may be learned by practice of the presented embodiments of the disclosure.

According to an embodiment, a sensor data acquisition method using a plurality of electronic devices includes receiving sample sensor data from each of the electronic devices for each predetermined period; generating reference data based on the sample sensor data; calculating a measurement accuracy of each of the electronic devices for each predetermined period based on at least one of the sample sensor data or the reference data; determining priority information of each of the electronic devices for each predetermined period based on at least one of the measurement accuracy or state information of each of the electronic devices; determining a measurement-activated electronic device and a measurement-deactivated electronic device from among the electronic devices based on the priority information; receiving sensor data from the measurement-activated electronic device for a time unit of a predetermined period; and determining whether to change the measurement-activated electronic device to another electronic device based on the priority information updated in each predetermined period.

According to an embodiment, an electronic device includes a processor configured to receive sample sensor data from each of a plurality of electronic devices for each predetermined period; generate reference data based on the sample sensor data; calculate a measurement accuracy of each of the electronic devices for each predetermined period based on at least one of the sample sensor data or the reference data; determine priority information of each of the electronic devices for each predetermined period based on at least one of the measurement accuracy or state information of each of the electronic devices; determine a measurement-activated electronic device and a measurement-deactivated electronic device from among the electronic devices based on the priority information; receive sensor data from the measurement-activated electronic device for a time unit of a predetermined period; and determine whether to change the measurement-activated electronic device to another electronic device based on the priority information updated in each predetermined period.

According to an embodiment of the disclosure, an electronic device may calculate reference data in each predetermined period, compare sample sensor data to the reference data, and calculate measurement accuracy of each electronic device.

According to an embodiment of the disclosure, an electronic device may determine a measurement-activated electronic device based on state information and measurement accuracy of each of different electronic devices in each predetermined period.

According to an embodiment of the disclosure, an electronic device may integrate sensors of various electronic devices that monitor health information of a user for a long time.

According to an embodiment of the disclosure, an electronic device may provide an accuracy-based biometric data acquisition method that may dynamically select an electronic device (or sensor) with the highest accuracy among selectable electronic devices (or sensors included in the electronic devices).

According to an embodiment of the disclosure, an electronic device may allow a user to acquire the most accurate biometric information from a plurality of electronic devices worn on the user and to receive an alarm.

According to an embodiment of the disclosure, an electronic device may provide a control function that enables long-time monitoring of biometric information of a user without a disconnection even while the user is unaware.

Other features and aspects will be apparent from the following detailed description, the drawings, and the claims.

BRIEF DESCRIPTION OF THE DRAWINGS

The above and other features of certain embodiments of the present disclosure will be more apparent from the following detailed description, taken in conjunction with the accompanying drawings, in which.

DETAILED DESCRIPTION

Figure 1:
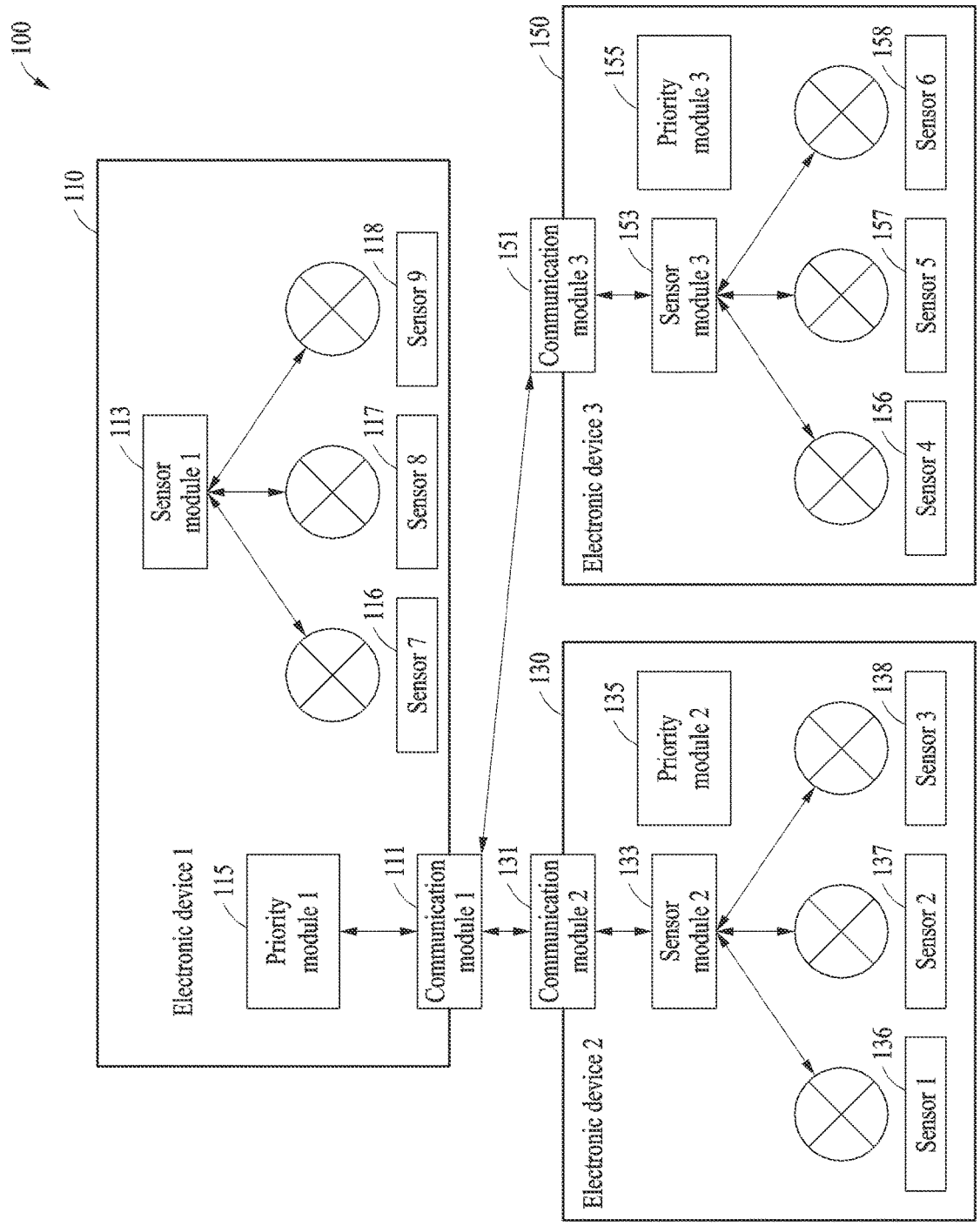
FIG. 1 is a diagram illustrating an example of a sensor data acquisition system according to an embodiment.

The following structural or functional descriptions are exemplary to merely describe the example embodiments, and the scope of the example embodiments is not limited to the descriptions provided in the disclosure. Various changes and modifications can be made thereto by those of ordinary skill in the art.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure.

It should be noted that if it is described that one component is "connected," "coupled," or "joined" to another component, a third component may be "connected," "coupled," and "joined" between the first and second components, although the first component may be directly connected, coupled, or joined to the second component. In contrast, it should be noted that if it is described that one component is "directly connected," "directly coupled," or "directly joined" to another component, a third component may be absent.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein.

According to various example embodiments described herein, an electronic device may be one of various types of electronic devices. The electronic device may include, for example, a portable communication device (e.g., a smartphone), a computer device, a portable multimedia device, a portable medical device, a camera, a wearable device, or a home appliance. However, the electronic device is not limited to those described above.

Hereinafter, various example embodiments will be described in greater detail with reference to the accompanying drawings. When describing the example embodiments with reference to the accompanying drawings, like reference numerals refer to like elements and a repeated description related thereto will be omitted.

FIG. 1 is a diagram illustrating an example of a sensor data acquisition system 100 according to an embodiment.

In FIG. 1, illustrated are electronic device 1 110, electronic device 2 130, electronic device 3 150, priority module 1 115, priority module 2 135, priority module 3 155, communication module 1 111, communication module 2 131, communication module 3 151, sensor module 1 113, sensor module 2 133, sensor module 3 153, sensor 1 136, sensor 2 137, sensor 3 138, sensor 4 156, sensor 5 157, sensor 6 158, sensor 7 116, sensor 8 117, and sensor 9 118.

According to an embodiment, an electronic device (e.g., an electronic device 1001 of FIG. 10) may include a priority module, a sensor module, a sensor, and/or a communication module. The electronic device 1001 may further include other components and may not include some of the components.

The priority module may include a module that determines a priority of each of a plurality of electronic devices and determines a target to which a measurement activating signal is to be transmitted. The electronic device 1001 may use the priority module to determine priorities of the electronic devices and transmit the measurement activating signal to an electronic device having the highest priority among the electronic devices. The sensor module may include a module that receives sensor data from one or more sensors. The communication module may include a module that communicates with another electronic device. The communication module may transmit the sensor data acquired from the sensors to the other electronic device.

The priority module may be activated or deactivated. For example, an electronic device in which a priority module is activated may transmit a measurement activating signal and/or a measurement deactivating signal to an electronic device in which a priority module is deactivated. For example, the electronic device in which the priority module is activated may be referred to as a primary electronic device, and the electronic device in which the priority module is deactivated may be referred to as a secondary electronic device. The primary electronic device and the secondary electronic device may be named according to respective roles of the electronic devices. Accordingly, when a priority module is activated, a corresponding electronic device may be referred to as the primary electronic device, and when a priority module is deactivated, a corresponding electronic device may be referred to as the secondary electronic device. The primary electronic device may transmit a measurement activating signal and/or a measurement deactivating signal to a plurality of secondary electronic devices. The primary electronic device may acquire sensor data from a secondary electronic device that has received the measurement activating signal. A secondary electronic device that has received the measurement deactivating signal may not acquire sensor data from a user.

According to an embodiment, the primary electronic device may be a mobile terminal, and the secondary electronic device may be a wearable device. The wearable device may include, for example, a watch, (eye)glasses, earphones, a headset, a ring, a band, a patch, wearable clothes, and/or wearable shoes. According to another embodiment, both the primary electronic device and the secondary electronic device may be wearable devices. For example, a wearable device that was once the secondary electronic device may become the primary electronic device when a priority module included in the wearable device is activated.

In the illustrated example, electronic device 1 110 may be an electronic device in which priority module 1 115 is activated, and electronic device 1 110 may thus be the primary electronic device. In this example, electronic device 2 130 and electronic device 3 150 may be electronic devices in which priority module 2 135 and priority module 3 155 are deactivated, respectively, and electronic device 2 130 and electronic device 3 150 may be the secondary electronic devices in relation to electronic device 1 110.

Electronic device 1 110 may receive sample sensor data from each of a plurality of electronic devices (e.g., electronic device 2 130 and electronic device 3 150) for each predetermined period.

According to an embodiment, sensor data used herein may include data acquired from a sensor. The sensor used herein may include a device that senses or detects a motion of an object or a characteristic thereof. The sensor may include, for example, a temperature sensor, a heart rate sensor, an electrocardiogram (ECG) sensor, a humidity sensor, a microphone, a geomagnetic sensor, an image sensor, a gyro sensor, an infrared sensor, and/or a motion detection sensor (or a motion sensor). The sample sensor data used herein may include sampled sensor data. The sample sensor data may be sensor data acquired for each predetermined period. For example, the sample sensor data may include sensor data having a length of 15 seconds acquired every 5 minutes.

For example, sensor 1 136 and sensor 4 156 may be temperature sensors. In this example, electronic device 2 130 may acquire temperature data from sensor 1 136 through sensor module 2 133. Electronic device 2 130 may transmit the temperature data from sensor 1 136 to electronic device 1 110 through communication module 2 131. In this example, electronic device 3 150 may acquire temperature data from sensor 4 156 through sensor module 3 153. Electronic device 3 150 may transmit the temperature data from sensor 4 156 to electronic device 1 110 through communication module 3 151. Electronic device 1 110 may receive the temperature data from sensor 1 136 and the temperature data from sensor 4 156 through communication module 1 111.

Electronic device 1 110 may generate reference data based on the sample sensor data. Electronic device 1 110 may generate the reference data based on the sample sensor data using priority module 1 115. The reference data may refer to data that is a reference for calculating measurement accuracy of each electronic device. An operation of generating the reference data will be described in detail later with reference to FIG. 2.

Electronic device 1 110 may calculate measurement accuracy of each of the electronic devices (e.g., electronic device 2 130 and electronic device 3 150) based on at least one of the sample sensor data or the reference data, in each predetermined period. The measurement accuracy may include accuracy in measurement of a sensor included in an electronic device. For example, electronic device 1 110 may receive sample sensor data from electronic device 2 130. In this example, electronic device 1 110 may calculate measurement accuracy based on a similarity between the sample sensor data from electronic device 2 130 and the reference data. The higher the similarity, the higher the measurement accuracy may be. Electronic device 1 110 may calculate the measurement accuracy based on the similarity between the sample sensor data from electronic device 2 130 and the reference data, in each predetermined period. An operation of calculating the measurement accuracy will be described in detail later with reference to FIG. 4.

Electronic device 1 110 may determine priority information of each of the electronic devices (e.g., electronic device 2 130 and electronic device 3 150) based on the measurement accuracy and state information of each of the electronic devices, in each predetermined period. The state information may include information associated with a state of an electronic device. The state information may include, for example, temperature information, battery information, network information, body contact state information, processor operation information, memory information, and/or power usage information. The body contact state information may include information associated with a state of contact between the electronic device and the body. The body contact state information may include, for example, information on a distance between the electronic device and the body, a foreign substance included between the electronic device and the body, or the like. As the distance between the electronic device and the body increases, the measurement accuracy may decrease. In addition, when a foreign substance is included between the electronic device and the body, the measurement accuracy may decrease. Accordingly, electronic device 1 110 may determine the priority information based on the body contact state information. The network information may include information associated with a state of a connection between the electronic device and another electronic device. In the case of a disconnection between the electronic devices, transmission of sensor data may not be possible. Alternatively, in the case of weak strength of a connection signal between the electronic devices, the connection may be lost during data transmission. Accordingly, electronic device 1 110 may determine the priority information based on the network information.

The priority information may include information for determining a measurement-activated electronic device. An electronic device having the highest priority may receive a measurement activating signal. In this case, a sensor of the electronic device having the highest priority may be activated to collect sensor data. In contrast, other electronic devices may receive a measurement deactivating signal and may not acquire data from their sensors.

For example, electronic device 1 110 may receive, from electronic device 2 130, measurement accuracy of electronic device 2 130 and state information of electronic device 2 130. For example, the measurement accuracy of electronic device 2 130 may be 90%, and a remaining battery level of electronic device 2 130 may be 90%. Also, the measurement accuracy of electronic device 3 150 may be 50%, and a remaining battery level of electronic device 3 150 may be 90%. In this example, since the measurement accuracy of electronic device 2 130 is higher than that of electronic device 3 150, electronic device 1 110 may determine electronic device 2 130 as the measurement-activated electronic device using priority module 1 115. For another example, the measurement accuracy of electronic device 2 130 may be 90%, and the remaining battery level of electronic device 2 130 may be 90%. Also, the measurement accuracy of electronic device 3 150 may be 90%, and the remaining battery level of electronic device 3 150 may be 10%. In this example, since the remaining battery level of electronic device 3 150 is 10%, there may be a risk of a battery of electronic device 3 150 being terminated soon. In contrast, the battery level of electronic device 2 130 is 90%, and electronic device 2 130 may be able to acquire sensor data for a longer period of time than electronic device 3 150. Accordingly, to continuously acquire sensor data, electronic device 1 110 may determine electronic device 2 130 as the measurement-activated electronic device, using priority module 1 115.

Electronic device 1 110 may determine a measurement-activated electronic device and a measurement-deactivated electronic device from among the electronic devices based on the priority information. The measurement-activated electronic device may include an electronic device in which a sensor included in the electronic device is activated. For example, electronic device 1 110 may acquire sensor data from an activated electronic device for a predetermined period.

The measurement-deactivated electronic device may include an electronic device in which a sensor included in the electronic device is deactivated. For example, electronic device 1 110 may not acquire sensor data from a deactivated electronic device for a predetermined period. In this example, measurement may not be performed on the measurement-deactivated electronic device using the sensor, and power consumption may be reduced.

Electronic device 1 110 may receive sensor data from the measurement-activated electronic device (e.g., electronic device 2 130) for a time unit of a predetermined period. According to an embodiment, the predetermined period may be a period for updating the reference data. According to another embodiment, the predetermined period may include a period for calculating the measurement accuracy of each of the electronic devices based on the updated reference data. For example, the predetermined period may correspond to an update every 15 minutes, an update every hour, or an update every 4 hours, or may be arbitrarily selected by a user or determined by an electronic device.

Electronic device 1 110 may receive the sensor data from the measurement-activated electronic device. When the sensor data satisfies a predetermined condition, electronic device 1 110 may provide notification information to the user. For example, when the heart rate of the user exceeds 90 beats per minute, electronic device 1 110 may provide the notification information associated with the heart rate to the user.

Electronic device 1 110 may determine whether to change the measurement-activated electronic device to another electronic device based on the priority information updated in each predetermined period. For example, the priority information may be updated every 15 minutes, which is a predetermined period. In this example, electronic device 1 110 may acquire sample sensor data from electronic device 2 130 and electronic device 3 150 every 15 minutes. Electronic device 1 110 may update the reference data using the sample sensor data. Electronic device 1 110 may calculate the measurement accuracy of each of electronic device 2 130 and electronic device 3 150 by comparing the updated reference data and each piece of the acquired sample sensor data. Electronic device 1 110 may update the priority information based on the updated measurement accuracy and the state information. An operation of changing the measurement-activated electronic device based on the priority information will be described in detail later with reference to FIG. 5.

According to another embodiment, the sensor data may include three-dimensional (3D) sensor data acquired from a motion detection sensor. The motion detection sensor may be required to detect a user's motion. The motion detection sensor may include, for example, an acceleration sensor, a gyro sensor, and/or a motion sensor capable of detecting and measuring a movement of joints or muscles of the body. To detect a user's motion, an electronic device may be attached to a part of the body of the user. In this case, when the user moves, motion detection sensors of electronic devices attached to body parts may generate sensor data of different dimensions. For example, sensor data of a motion detection sensor of an electronic device attached to an arm of the user may have a different dimension from that of sensor data of a motion detection sensor of an electronic device attached to a leg of the user. For example, both a 3D x-axis acceleration of the arm and a 3D x-axis acceleration of the leg, which are acquired from a walking motion of the same user, may be different. In this example, to generate reference data for the x-axis acceleration acquired from the different body parts, it may be necessary to transform the x-axis acceleration of the arm and the x-axis acceleration of the leg into the same dimension. This is because the reference data is necessary to calculate the measurement accuracy. That is, to calculate the measurement accuracy of the electronic device attached to the arm and the measurement accuracy of the electronic device attached to the leg, it may be necessary to generate the reference data by transforming the sensor data of the arm and the sensor data of the leg into the same dimension.

According to an embodiment, a reference dimension may refer to a dimension in which pieces of 3D sensor data acquired from motion detection sensors attached to different body parts in a 3D space are mapped to a specific motion. For example, even for the same walking motion of the user, 3D sensor data acquired from motion detection sensors attached to different body parts may all be different. In this case, by mapping pieces of 3D sensor data corresponding to different body parts to the reference dimension, it is possible to calculate the measurement accuracy of each sensor for the same walking motion. An operation of generating the reference data may include generating the reference data based on pieces of 3D sample sensor data acquired from motion detection sensors included in respective electronic devices provided in different body parts of the user. According to an embodiment, an electronic device may transform each of the pieces of 3D sample sensor data acquired from the different body parts of the user into the reference dimension. The electronic device may also transform the pieces of 3D sample sensor data acquired from the different body parts of the user into the reference dimension using a neural network. For example, the electronic device may transform sample sensor data of the x-axis acceleration of the arm and sample sensor data of the x-axis acceleration of the leg into the same reference dimension. The electronic device may generate the reference data based on the 3D sample sensor data transformed into the reference dimension.

The electronic device may calculate the measurement accuracy every predetermined period. The electronic device may transform data into the reference dimension for each piece of 3D sample sensor data. The electronic device may calculate the measurement accuracy based on a similarity between the reference data and the 3D sample sensor data of the reference dimension. For example, electronic device 2 130 may be a device attached to an arm, and electronic device 3 150 may be a device attached to a leg. In addition, sensor 1 136 included in electronic device 2 130 may be an acceleration sensor, and sensor 4 156 included in electronic device 3 150 may also be an acceleration sensor. In this example, electronic device 1 110 may transform x-axis acceleration sample sensor data of electronic device 2 130 and x-axis acceleration sample sensor data of electronic device 3 150 into a reference dimension. In this example, electronic device 1 110 may calculate the measurement accuracy based on a similarity between the reference data and the x-axis acceleration sample sensor data of electronic device 2 130 transformed into the reference dimension. Electronic device 1 110 may also calculate the measurement accuracy based on a similarity between the reference data and the x-axis acceleration sample sensor data of electronic device 3 150 transformed into the reference dimension. Electronic device 1 110 may then compare the measurement accuracy of electronic device 2 130 and the measurement accuracy of electronic device 3 150 and determine a measurement-activated electronic device from between the two. In this way, electronic device 1 110 may calculate measurement accuracy from 3D sensor data acquired from the same type of sensors attached to different dimensions in space (e.g., acceleration sensors attached to arms, legs, and waist).

Figure 2:
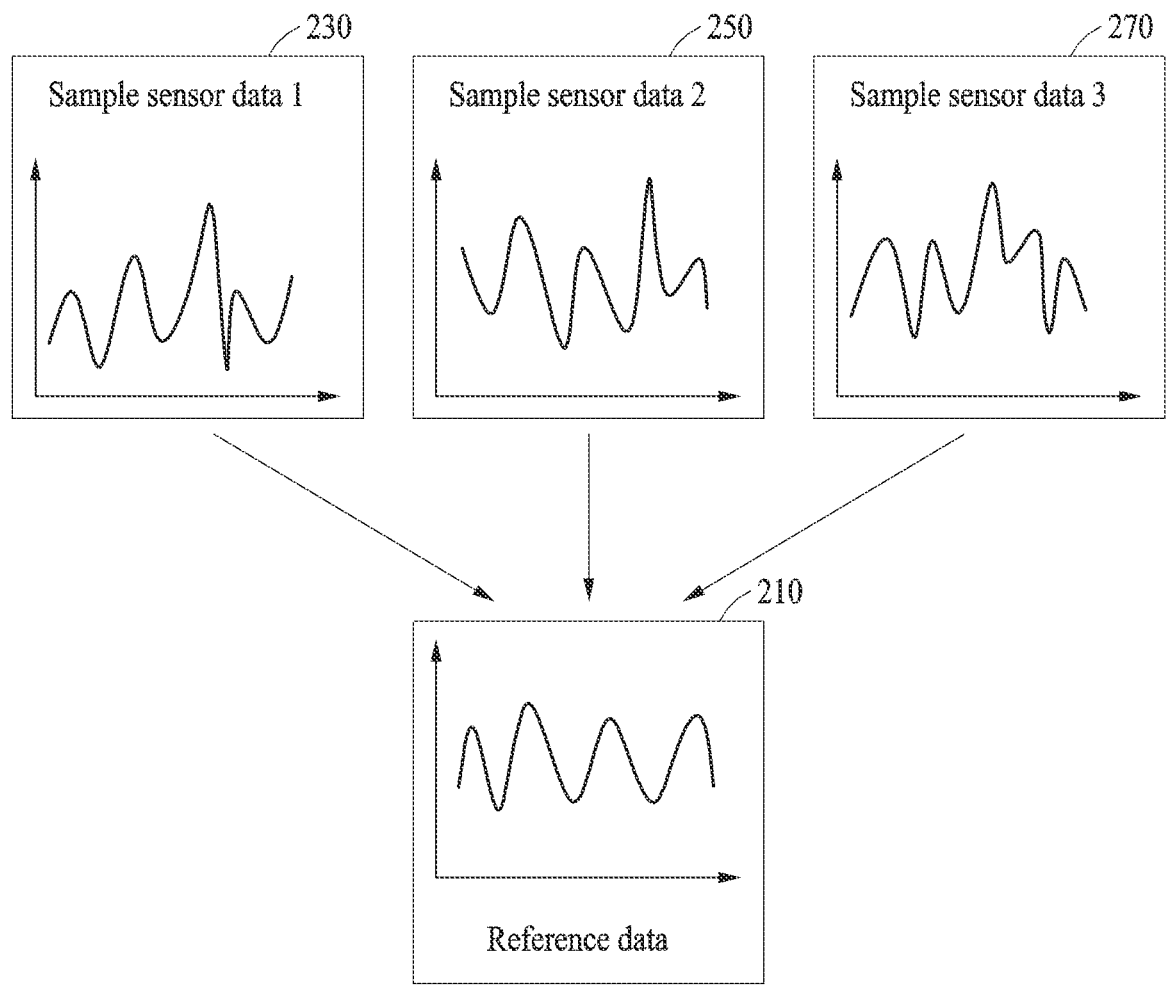
FIG. 2 is a diagram illustrating an example of determining reference data according to an embodiment.

FIG. 2 is a diagram illustrating an example of determining reference data according to an embodiment.

In FIG. 2, illustrated are sample sensor data 1 230, sample sensor data 2 250, sample sensor data 3 270, and reference data 210.

The reference data 210 may include data generated based on a common characteristic of a plurality of pieces of sample sensor data. For example, electronic device 1 110 may generate the reference data 210 based on a common characteristic of sample sensor data 1 230, sample sensor data 2 250, and sample sensor data 3 270. Since the reference data 210 includes the common characteristic of a plurality of pieces of sample sensor data, it may be a reference for determining measurement accuracy.

According to an embodiment, an electronic device (e.g., an electronic device 1001 of FIG. 10) may generate reference data. The electronic device 1001 may normalize a plurality of pieces of sample sensor data. The normalization described herein may refer to an operation of removing abnormal data included in sensor data. The abnormal data may include data that interferes with a data pattern analysis.

The electronic device 1001 may generate the reference data based on an average value of the normalized pieces of sample sensor data. For example, the sensor data may be heart rate data. In this example, the electronic device 1001 may generate the reference data by calculating an average value of pieces of heart rate data acquired from a plurality of electronic devices. For example, in a case in which heart rate data acquired from electronic device 2 130 and electronic device 3 150 at 16:04 pm on October 17 are 80 and 86, respectively, the reference data may be 83, which is an average between 80 and 86.

According to an embodiment, the electronic device 1001 may normalize a plurality of pieces of sample sensor data. The electronic device 1001 may remove noise included in the pieces of sample sensor data. The noise described herein may include sensor data generated based on a body attachment state of an electronic device, which indicates a state of how the electronic device is attached to a user's body. For example, the noise may be generated when sweat is included between the electronic device and the body. For another example, the noise may be generated when a distance between the electronic device and the body is great. For another example, the noise may be generated when there is a large movement of a body part to which the electronic device is attached.

According to an embodiment, the electronic device 1001 may remove an irregular pattern included in the pieces of sample sensor data. The irregular pattern described herein may include a behavior pattern different from a usual behavior pattern of the user. For example, when walking is a normal behavior pattern of the user, sudden running may be a different behavior pattern of the user. For example, the user may walk slowly and then suddenly run to cross a crosswalk. In addition, the user may walk slowly and then run along with their dog because their dog suddenly runs. In this case, sensor data may include an irregular pattern, which may cause some issues when generating reference data necessary to calculate measurement accuracy. That is, when the reference data is generated, with the irregular pattern included in the sample sensor data, a reference may then be incorrectly established and the measurement accuracy may also be incorrectly calculated.

According to an embodiment, the electronic device 1001 may remove outlier data included in the pieces of sample sensor data. The outlier data described herein may include data having an abnormally larger value or smaller value than other sensor data. The electronic device 1001 may define and remove, as the outlier data, a certain percentage of a maximum value or greater included in the sample sensor data. For example, the electronic device 1001 may define 95% or more of the maximum value as the outlier data and remove the defined outlier data.

Figure 3:
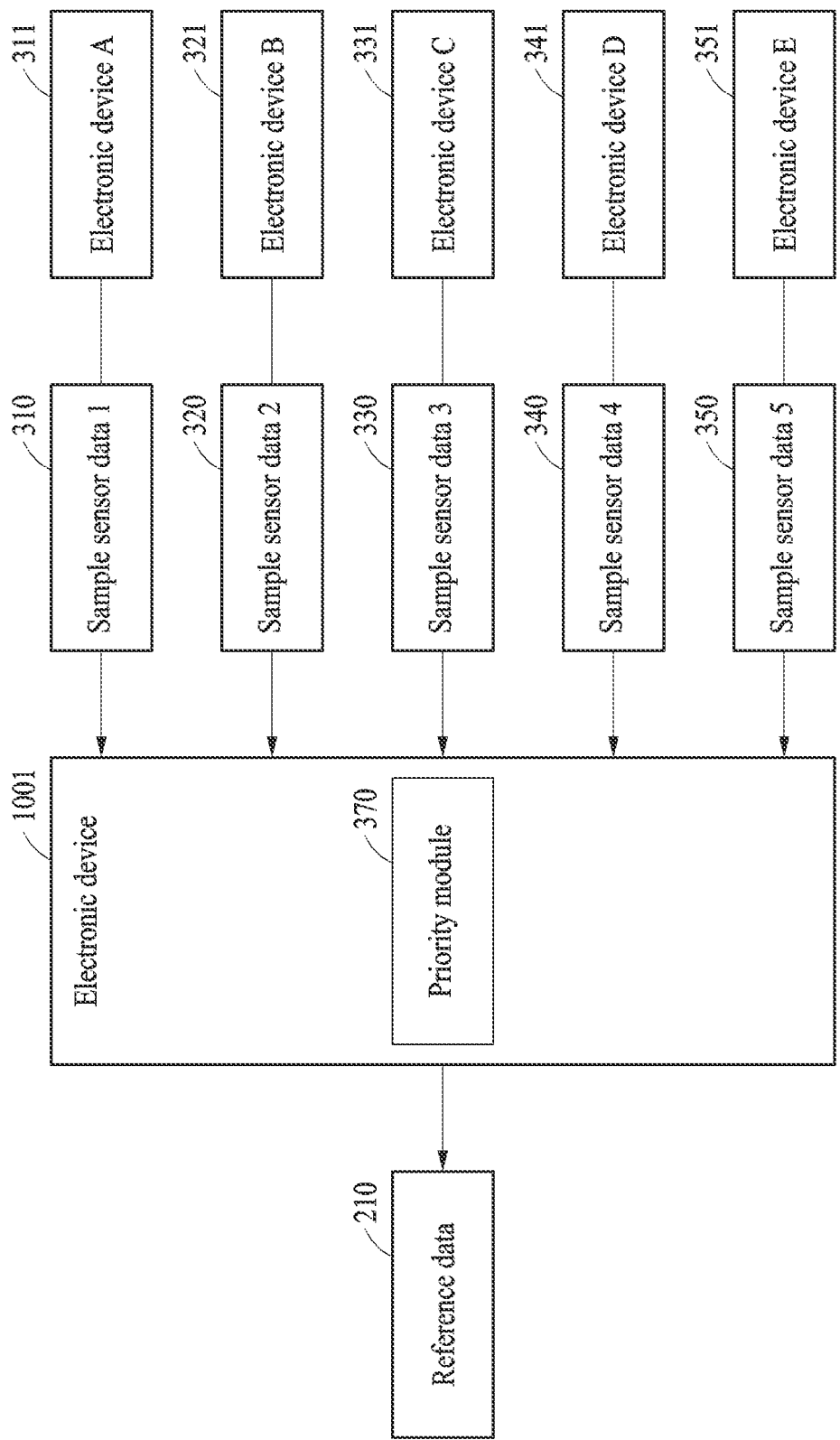
FIG. 3 is a diagram illustrating an example of determining reference data from among a plurality of pieces of sample sensor data according to an embodiment.

FIG. 3 is a diagram illustrating an example of determining reference data from among a plurality of pieces of sample sensor data according to an embodiment.

In FIG. 3, illustrated are reference data 210, an electronic device 1001, a priority module 370, a plurality of pieces of sample sensor data (e.g., sample sensor data 1 310, sample sensor data 2 320, sample sensor data 3 330, sample sensor data 4 340, and sample sensor data 5 350), and a plurality of electronic devices (e.g., an electronic device A 311, an electronic device B 321, an electronic device C 331, an electronic device D 341, and an electronic device E 351).

According to an embodiment, the electronic device 1001 may acquire sample sensor data 1 310 from the electronic device A 311, sample sensor data 2 320 from the electronic device B 321, sample sensor data 3 330 from the electronic device C 331, sample sensor data 4 340 from the electronic device D 341, and sample sensor data 5 350 from the electronic device E 351.

The pieces of sample sensor data 310, 320, 330, 340, and 350 may be data acquired in each predetermined period. The electronic device 1001 may generate the reference data 210 based on the pieces of sample sensor data 310, 320, 330, 340, and 350 every predetermined period.

The priority module 370 may include a module that provides information for determining a measurement-activated electronic device based on priority information of the electronic devices 311, 321, 331, 341, and 351.

Figure 4:
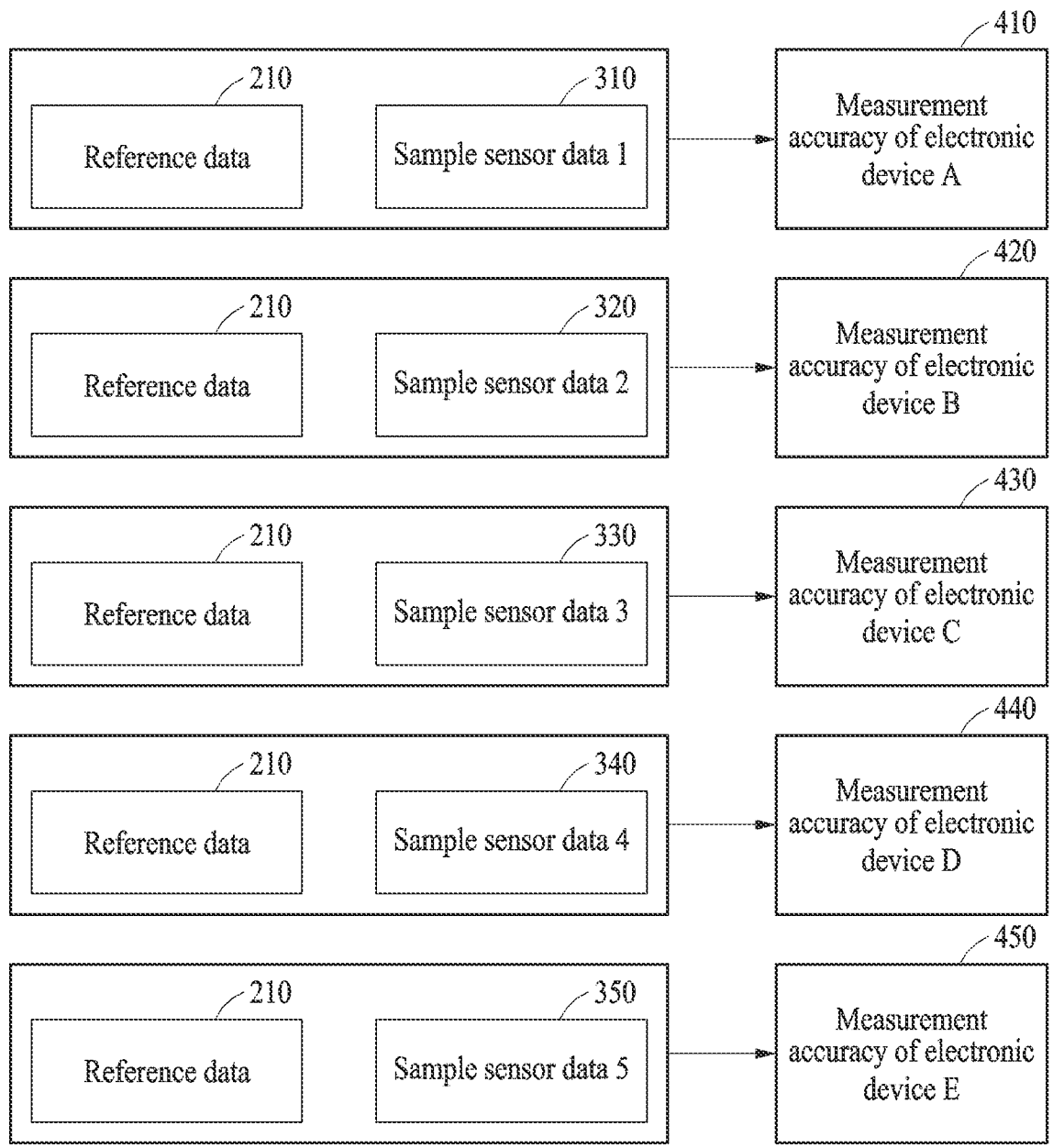
FIG. 4 is a diagram illustrating an example of calculating measurement accuracy according to an embodiment.

FIG. 4 is a diagram illustrating an example of calculating measurement accuracy according to an embodiment.

In FIG. 4, illustrated are reference data 210, a plurality of pieces of sample sensor data (e.g., sample sensor data 1 310, sample sensor data 2 320, sample sensor data 3 330, sample sensor data 4 340, and sample sensor data 5 350), and measurement accuracy (e.g., 410, 420, 430, 440, and 450) of respective electronic devices (e.g., electronic devices A, B, C, D, and E).

The electronic device 1001 may calculate the measurement accuracy. The electronic device 1001 may calculate the measurement accuracy based on a similarity between the reference data 210 and each of the pieces of sample sensor data 310, 320, 330, 340, and 350 respectively corresponding to the electronic devices A, B, C, D, and E. In this case, reference data may be data for determining the measurement accuracy. For example, the reference data 210 may be data including a common characteristic of the pieces of sample sensor data 310, 320, 330, 340, and 350. For example, the electronic device 1001 may calculate the measurement accuracy 410 of the electronic device A based on a similarity between the reference data 210 and sample sensor data 1 310. The higher the similarity, the higher the measurement accuracy may be.

The electronic device 1001 may calculate the measurement accuracy based on at least one of an average similarity, a maximum similarity, a minimum similarity, or a repetitive period similarity, between the reference data 210 and each of the pieces of sample sensor data 310, 320, 330, 340, and 350 respectively corresponding to the electronic devices A, B, C, D, and E. For example, the electronic device 1001 may calculate a similarity between a maximum value of sample sensor data 1 310 and a maximum value of the reference data 210. For example, when the maximum value of sample sensor data 1 310 is a heart rate of 150 and the maximum value of the reference data 210 is a heart rate of 90, the similarity between the maximum value of sample sensor data 1 310 and the maximum value of the reference data 210 may be low, and thus the measurement accuracy 410 of the electronic device A may be low. The repetitive period similarity may include a similarity in a period in which a predetermined pattern is repeatedly exhibited. For example, a repetitive period may include a period of a pattern that is repeatedly exhibited when a user walks. For example, the electronic device 1001 may calculate the measurement accuracy 420 of the electronic device B based on a similarity between a repetitive period of the reference data 210 and a repetitive period of sample sensor data 2 320. That is, when the similarity between the repetitive period of the reference data 210 and the repetitive period of sample sensor data 2 320 increases, the measurement accuracy 420 of the electronic device B may increase.

Figure 5:
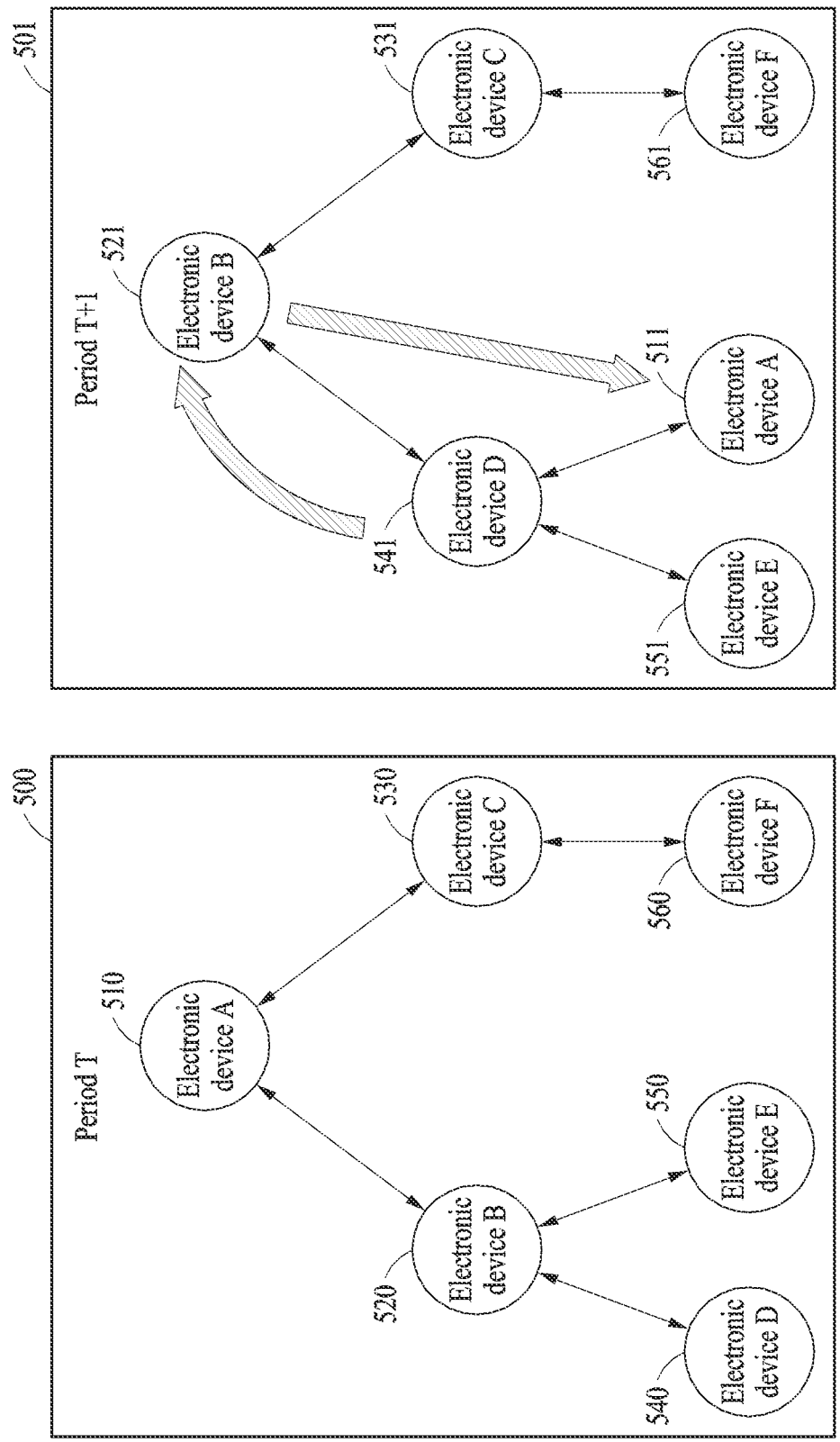
FIG. 5 is a diagram illustrating an example of changing priority information according to an embodiment.

FIG. 5 is a diagram illustrating an example of changing priority information according to an embodiment.

In FIG. 5, illustrated are a priority queue 500 in a period T, a priority queue 501 in a period T+1, a plurality of electronic devices 510, 520, 530, 540, 550, and 560 in the period T, and a plurality of electronic devices 511, 521, 531, 541, 551, and 561 in the period T+1.

According to an embodiment, the electronic device 1001 may determine priority information in each predetermined period and then update a priority queue based on the priority information in each predetermined period. The priority queue described herein may refer to a data structure in which data having a higher priority comes out first regardless of the order in which it enters the queue.

The priority queue may include a binary tree in which a priority of an electronic device corresponding to a parent node is higher than a priority of an electronic device corresponding to a child node. For example, in the period T, the electronic device A 510 may have a higher priority than the electronic device B 520 and the electronic device C 530. The electronic device B 520 may have a higher priority than the electronic device D 540 and the electronic device E 550.

For example, as illustrated, the priority queue 500 in the period T may be changed in the period T+1 which is a subsequent period of the period T. In the subsequent period T+1, the electronic device 1001 may update the priority information based on at least one of measurement accuracy or state information. In this case, the priority of the electronic device A 510 in the period T may be lowered. In this case, the electronic device 1001 may compare priority information of the electronic device B 521 and priority information of the electronic device C 531. When it is determined that the electronic device B 521 has a higher priority than the electronic device C 531, the electronic device B 521 may be positioned at a root node of the priority queue 501. The electronic device A 511 may be positioned at a child node of the electronic device D 541 based on the changed priority information.

Figure 6:
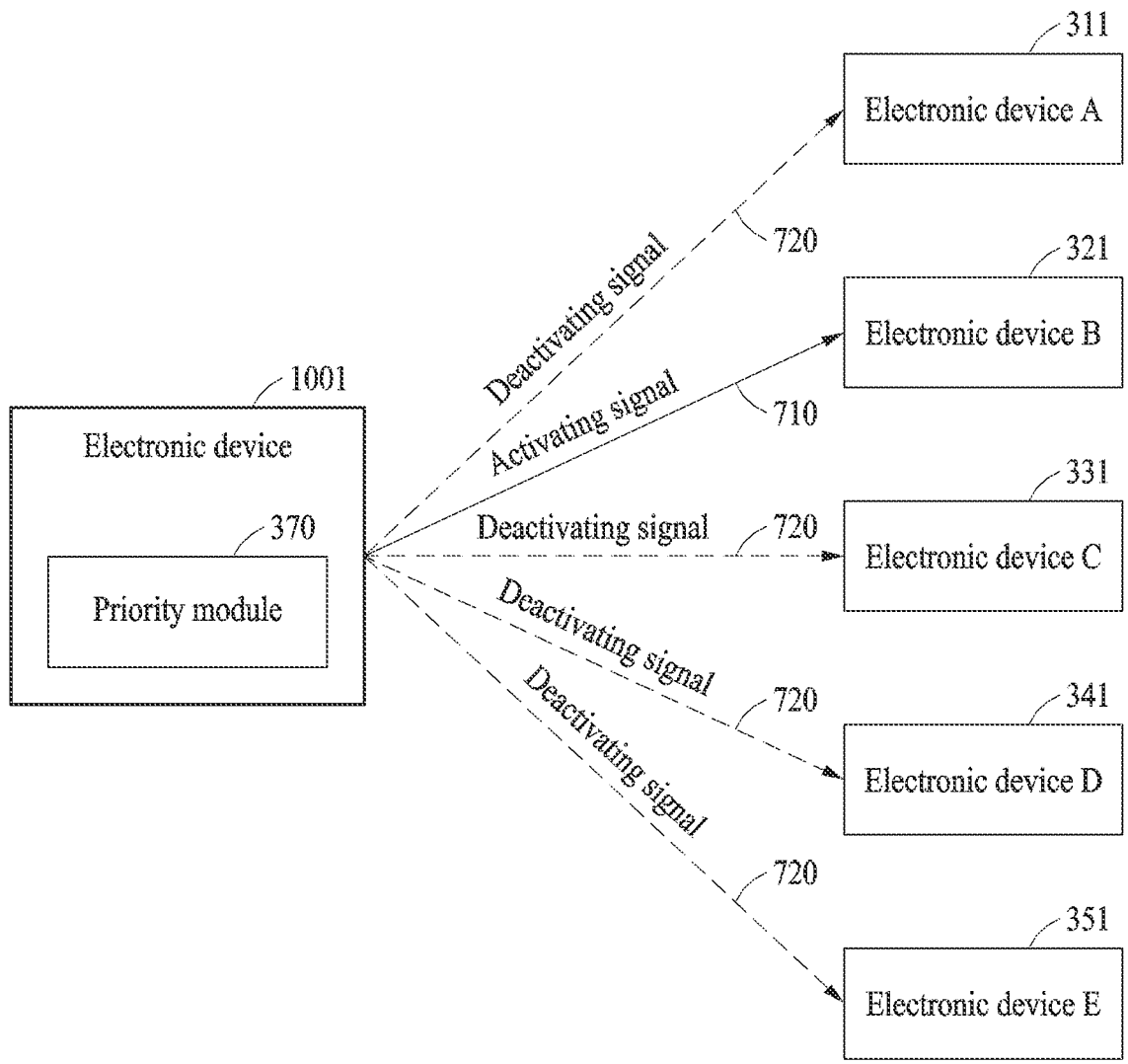
FIG. 6 is a diagram illustrating an example of a measurement-activated electronic device and an example of a measurement-deactivated electronic device according to an embodiment.

FIG. 6 is a diagram illustrating an example of a measurement-activated electronic device and an example of a measurement-deactivated electronic device according to an embodiment.

In FIG. 6, illustrated are an electronic device 1001, a priority module 370, an activating signal 710, a deactivating signal 720, and a plurality of electronic devices (e.g., an electronic device A 311, an electronic device B 321, an electronic device C 331, an electronic device D 341, and an electronic device E 351).

According to an embodiment, the electronic device 1001 may determine a measurement-activated electronic device. The electronic device 1001 may determine the measurement-activated electronic device by using the priority module 370. The electronic device 1001 may determine, as the measurement-activated electronic device, an electronic device corresponding to a root node of a priority queue. For example, as illustrated in FIG. 5, the electronic device 1001 may determine, as the measurement-activated electronic device, the electronic device B 521 corresponding to the root node of the priority queue.

The electronic device 1001 may transmit the activating signal 710 to the measurement-activated electronic device. For example, the electronic device B 321 may be the measurement-activated electronic device. In this example, the electronic device 1001 may transmit the activating signal 710 to the electronic device B 321. Upon receiving the activating signal 710, the electronic device B 321 may activate a sensor included in the electronic device B 321 to collect sensor data for a time unit corresponding to a predetermined period. The electronic device 1001 may also transmit the deactivating signal 720 to a measurement-deactivated electronic device. For example, the electronic device 1001 may transmit the deactivating signal 720 to the electronic device A 311, the electronic device C 331, the electronic device D 341, and the electronic device E 351. In this example, respective sensors included in the electronic device A 311, the electronic device C 331, the electronic device D 341, and the electronic device E 351 may be deactivated.

According to an embodiment, the electronic device 1001 may change the measurement-activated electronic device to another electronic device. For example, as illustrated in FIG. 5, the electronic device A 510 may be the measurement-activated electronic device in the period T, but the electronic device B 521 may become the measurement-activated electronic device in the subsequent period T+1. When the priority information is changed as described above, the electronic device 1001 may change the measurement-activated electronic device to another electronic device.

According to an embodiment, the electronic device 1001 may transmit a measurement end signal to a first electronic device which is previously the measurement-activated electronic device. For example, as illustrated in FIG. 5, the electronic device 1001 may transmit the measurement end signal to the electronic device A 510 which is the measurement-activated electronic device in the period T. In this example, the electronic device A 510 may be the first electronic device. The electronic device 1001 may transmit a measurement start signal to a second electronic device different from the first electronic device. For example, in the period T+1, the electronic device B 521 may be the second electronic device.

Figure 7:
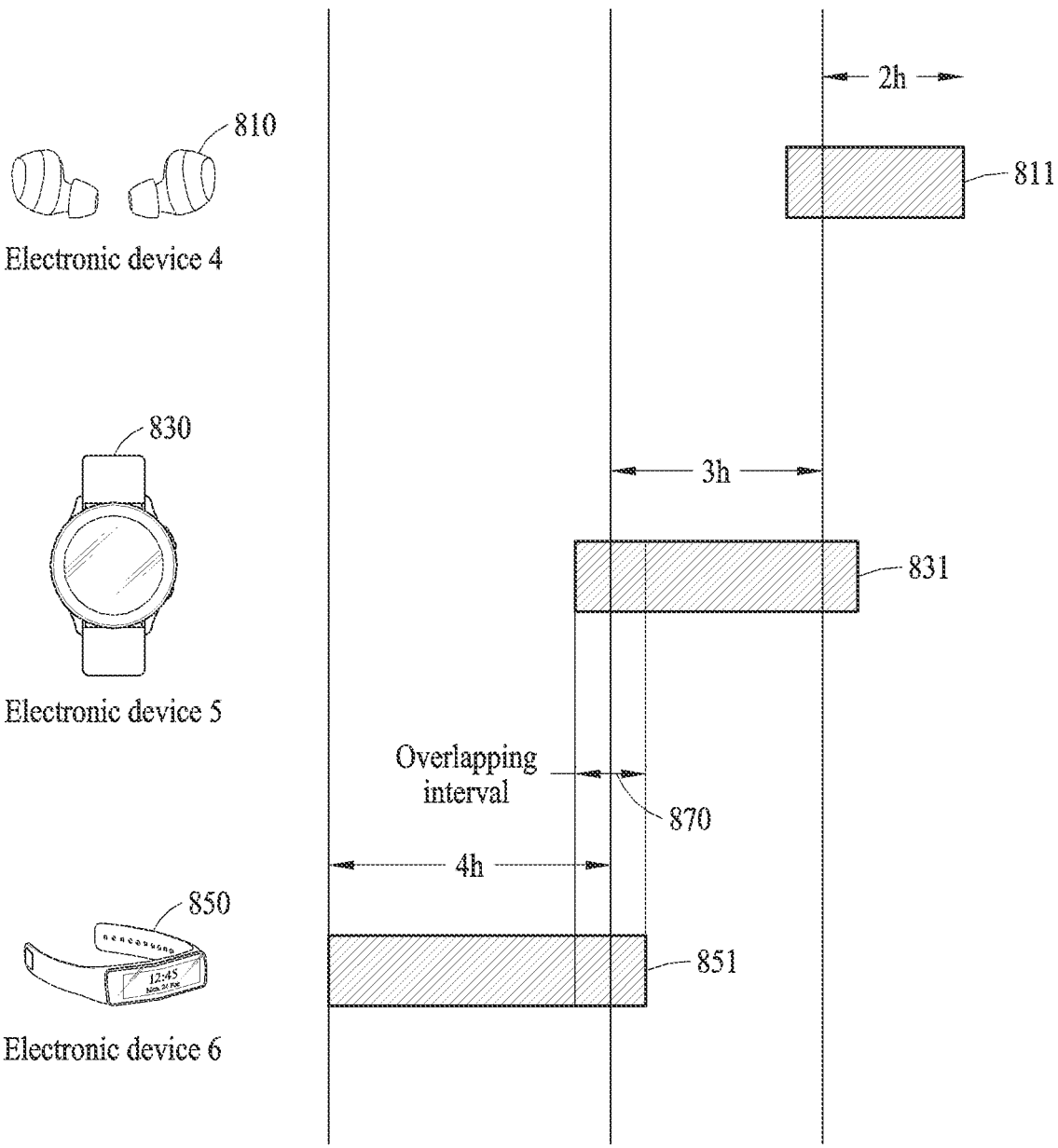
FIG. 7 is a diagram illustrating an example of correcting a sensor data overlapping interval according to an embodiment.

FIG. 7 is a diagram illustrating an example of correcting a sensor data overlapping interval according to an embodiment.

In FIG. 7, illustrated are electronic device 4 810, electronic device 5 830, electronic device 6 850, sensor data 811 of electronic device 4 810, sensor data 831 of electronic device 5 830, sensor data 851 of electronic device 6 850, and an overlapping interval 870.

According to an embodiment, the electronic device 1001 may determine a measurement-activated electronic device based on priority information for each predetermined period. For example, the predetermined period may be 1 hour. Since electronic device 6 850 has the highest priority, the electronic device 1001 may receive sensor data from electronic device 6 850 for 4 hours. However, in a subsequent period, a priority of electronic device 5 830 may become higher than that of electronic device 6 850, and the electronic device 1001 may receive sensor data from electronic device 5 830.

When the measurement-activated electronic device changes from electronic device 6 850 to electronic device 5 830, the electronic device 1001 may receive the sensor data from electronic device 6 850 and electronic device 5 830 such that the overlapping interval 870 in which the received sensor data overlaps is generated. According to an embodiment, after transmitting a measurement activating signal to a second electronic device, the electronic device 1001 may transmit a measurement deactivating signal to a first electronic device. For example, when a predetermined time elapses after transmitting the measurement activating signal 710 to electronic device 5 830, the electronic device 1001 may transmit the measurement deactivating signal 720 to electronic device 6 850.

According to an embodiment, the electronic device 1001 may correct sensor data received from the first electronic device and the second electronic device at the same point in time based on reference data. For example, the electronic device 1001 may correct the overlapping interval 870 in which the sensor data received from electronic device 6 850 and the sensor data received from electronic device 5 830 overlap, based on the reference data.

According to an embodiment, sensor data may be biased due to a deviation between a sensor included in a previous electronic device and a sensor included in a subsequent electronic device. Therefore, when connected in the overlapping interval 870, it is possible to provide seamless sensor data through the correction based on the reference data.

When changing a measurement-activated electronic device, sensors included in electronic devices may measure accurate sensor data only after entering a stable state as a predetermined time elapses from the start of the measurement. Accordingly, an overlapping interval may be provided to end an operation of a sensor included in a previous electronic device only when a sensor included in a subsequent electronic device becomes able to stably perform the measurement. It is thus possible to continuously measure sensor data without disconnection as much as possible even though the sensor data is received from different electronic devices.

Figure 8:
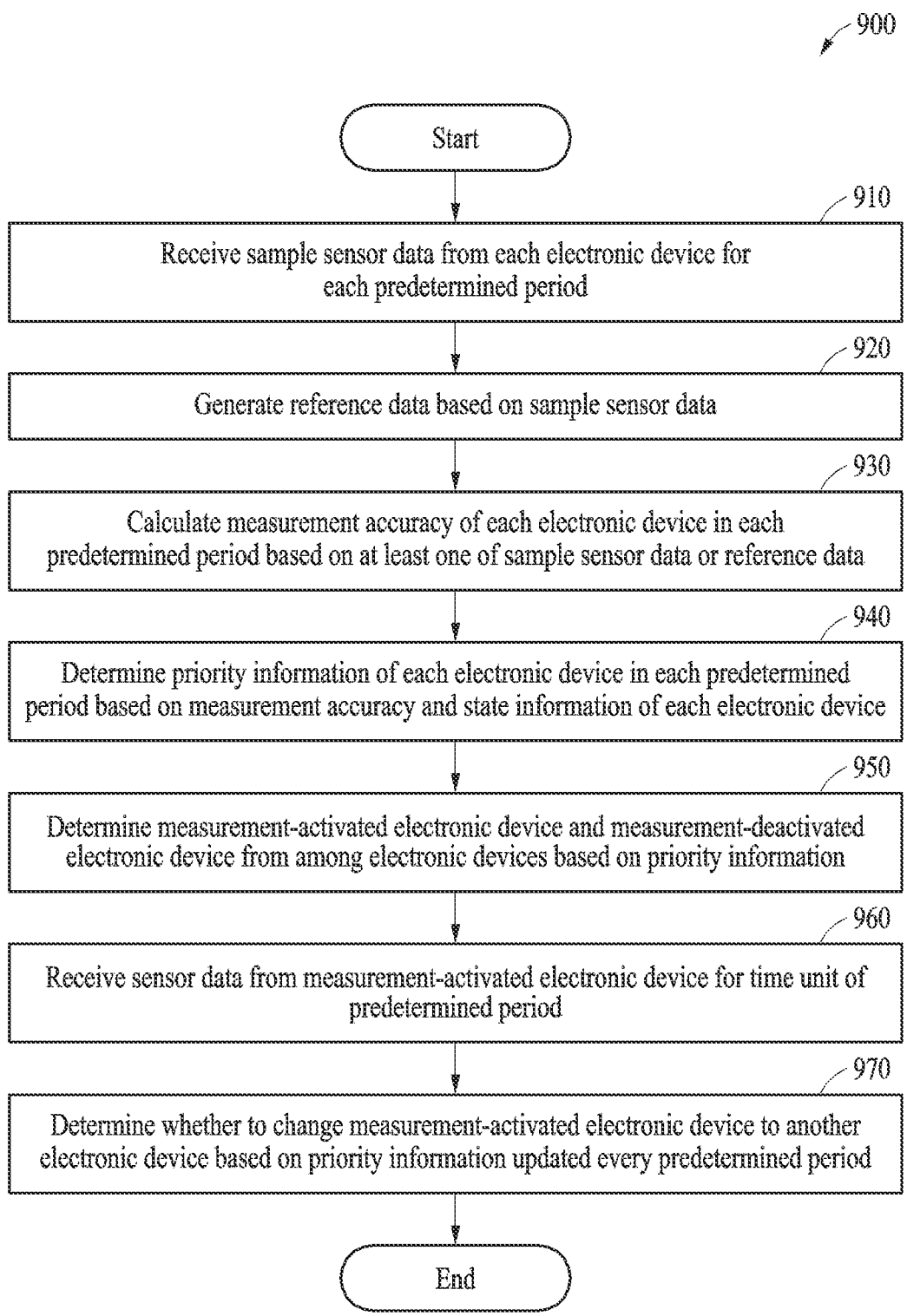
FIG. 8 is a flowchart illustrating an example of a sensor data acquisition method according to an embodiment.

FIG. 8 is a flowchart illustrating an example of a sensor data acquisition method 900 according to an embodiment.

According to an embodiment, the sensor data acquisition method 900 using a plurality of electronic devices may include operation 910 of receiving sample sensor data from each of the electronic devices for each predetermined period; operation 920 of generating reference data based on the sample sensor data; operation 930 of calculating a measurement accuracy of each of the electronic devices for each predetermined period based on at least one of the sample sensor data or the reference data; operation 940 of determining priority information of each the electronic devices for each predetermined period based on the measurement accuracy and state information of each of the electronic devices; operation 950 of determining a measurement-activated electronic device and a measurement-deactivated electronic device from among the electronic devices based on the priority information; operation 960 of receiving sensor data from the measurement-activated electronic device for a time unit of a predetermined period; and operation 970 of determining whether to change the measurement-activated electronic device to another electronic device based on the priority information updated every predetermined period.

The reference data may include data generated based on a common characteristic of a plurality of pieces of sample sensor data.

The generating of the reference data may include normalizing the pieces of sample sensor data, and generating the reference data based on an average value of the normalized pieces of sample sensor data.

The normalizing of the pieces of sample sensor data may include at least one of removing noise from the pieces of sample sensor data, removing an irregular pattern from the pieces of sample sensor data, or removing outlier data from the pieces of sample sensor data.

The calculating of the measurement accuracy may include calculating the measurement accuracy based on a similarity between the sample sensor data corresponding to each of the electronic devices and the reference data.

The calculating of the measurement accuracy may include calculating the measurement accuracy based on at least one of an average similarity, a maximum similarity, a minimum similarity, or a repetitive period similarity, between the sample sensor data corresponding to each of the electronic devices and the reference data.

The sensor data acquisition method may further include after determining the priority information for each predetermined period, updating a priority queue based on the priority information for each predetermined period.

The priority queue may include a binary tree in which a priority of an electronic device corresponding to a parent node is greater than a priority of an electronic device corresponding to a child node.

The determining of the measurement-activated electronic device may include determining, as the measurement-activated electronic device, an electronic device corresponding to a root node of the priority queue.

The changing of the measurement-activated electronic device to another electronic device may include transmitting a measurement deactivating signal to a first electronic device that was the measurement-activated electronic device, and transmitting a measurement activating signal to a second electronic device different from the first electronic device.

The changing of the measurement-activated electronic device to another electronic device may include transmitting the measurement deactivating signal to the first electronic device after transmitting the measurement activating signal to the second electronic device.

The sensor data acquisition method may further include correcting sensor data received at a same point in time from the first electronic device and the second electronic device based on the reference data.

The generating of the reference data may include generating the reference data based on 3D sample sensor data acquired from a motion detection sensor included in each of the electronic devices at different body parts of a user.

The generating of the reference data may include transforming, into a reference dimension, the 3D sample sensor data acquired from the different body parts of the user, and generating the reference data based on the 3D sample sensor data transformed into the reference dimension.

The calculating of the measurement accuracy for each predetermined period may include transforming each piece of 3D sample sensor data into a reference dimension, and calculating the measurement accuracy based on a similarity between the 3D sample sensor data of the reference dimension and the reference data.

According to an embodiment, a non-transitory computer-readable storage medium may store instructions that, when executed by a processor (e.g., a processor 1020 of FIG. 10), cause the processor to perform the sensor data acquisition method 900 as a computer program product.

According to an embodiment, after completing operations 910, 920, 930, 940, 950, 960, and 970, a processor (e.g., a processor 1020 of FIG. 10) may return to operation 910 and receive sample sensor data from each of the electronic devices for each predetermined period. By iteratively performing operations 910, 920, 930, 940, 950, 960, and 970, the processor 1020 may acquire accurate sensor data using a plurality of wearable devices.

According to an embodiment, an electronic device (e.g., the electronic device 1001 of FIG. 10) may include a processor (e.g., a processor 1020 of FIG. 10) configured to receive sample sensor data from each of a plurality of electronic devices for each predetermined period; generate reference data based on the sample sensor data; calculate a measurement accuracy of each of the electronic devices for each predetermined period based on at least one of the sample sensor data or the reference data; determine priority information of each of the electronic devices for each predetermined period based on at least one of the measurement accuracy or state information of each of the electronic devices; determine a measurement-activated electronic device and a measurement-deactivated electronic device from among the electronic devices based on the priority information; receive sensor data from the measurement-activated electronic device for a time unit of a predetermined period; and determine whether to change the measurement-activated electronic device to another electronic device based on the priority information updated in each predetermined period.

According to an embodiment, generation of the reference data may include where the processor is configured to normalize the sample sensor data by performing at least one of: removing noise from the sample sensor data, removing an irregular pattern from the sample sensor data, or removing outlier data from the sample sensor data; and generate the reference data based on an average value of the normalized sample sensor data.

According to an embodiment, the change of the measurement-activated electronic device to the other electronic device may include transmitting a measurement deactivating signal to a first electronic device which was the measurement-activated electronic device, transmitting a measurement activating signal to a second electronic device different from the first electronic device, and correcting sensor data received from the first electronic device and the second electronic device at a same point in time, based on the reference data.

According to an embodiment, generation of the reference data may include generating the reference data based on 3D sample sensor data acquired from motion detection sensors respectively in the electronic devices positioned at different body parts of a user; transforming, into a reference dimension, each of the 3D sample sensor data acquired from the different body parts of the user; and generating the reference data based on the 3D sample sensor data transformed into the reference dimension.

Figure 9:
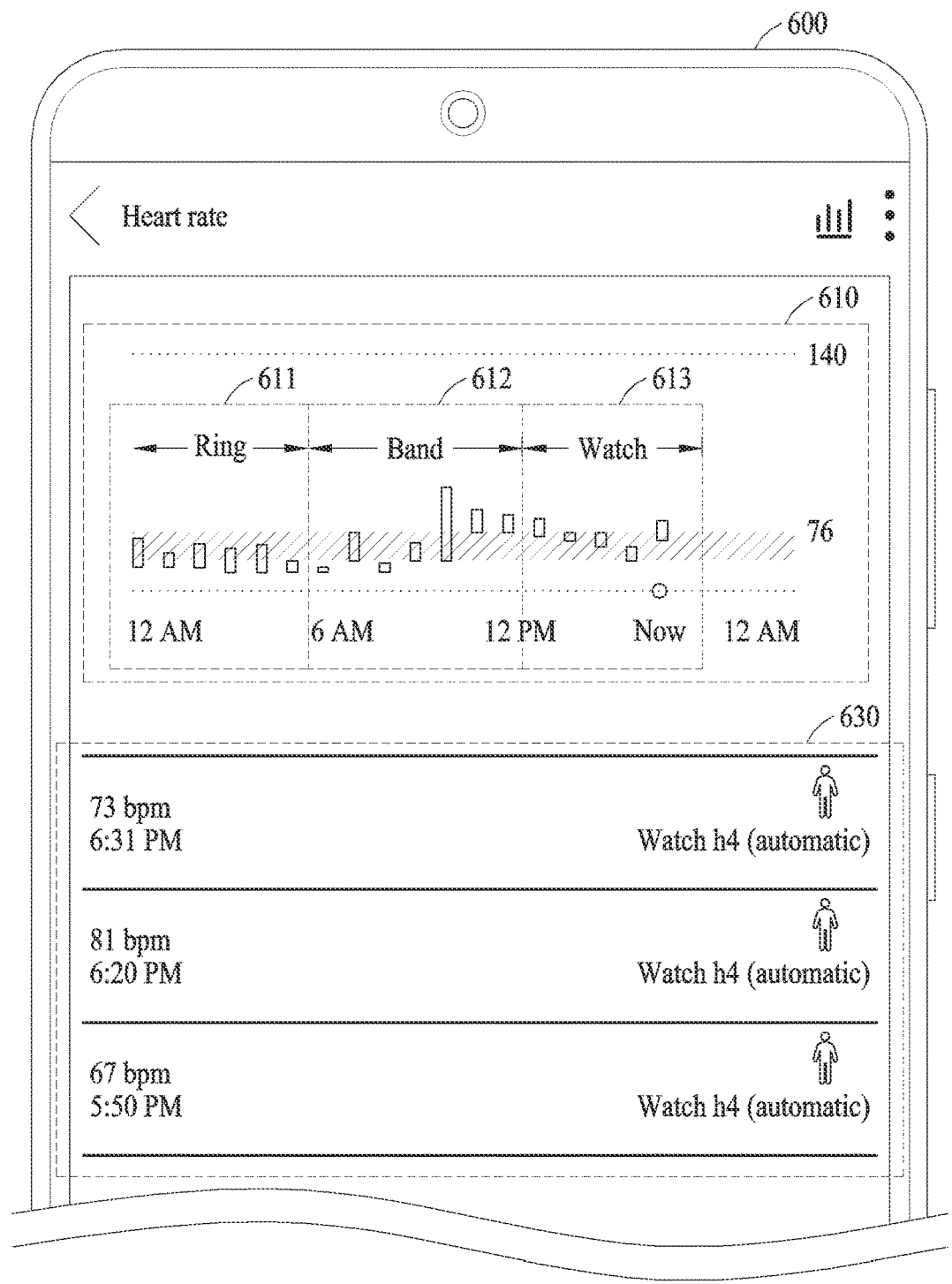
FIG. 9 is a diagram illustrating an example of a screen outputting a result of correction performed on a sensor data overlapping interval according to an embodiment.

FIG. 9 is a diagram illustrating an example of a screen outputting a result of correction performed on a sensor data overlapping interval according to an embodiment.

In FIG. 9, illustrated are a sensor data output screen 600 on which sensor data is output, sensor data 610, sensor data 611 acquired from a ring, sensor data 612 acquired from a band, sensor data 613 acquired from a watch, and a heart rate data source display area 630.

The sensor data output screen 600 may include a user interface (UI) for displaying sensor data acquired from an electronic device. The illustrated layout and/or configuration of the sensor data output screen 600 is provided merely as an example, and sensor data may be displayed through other layouts and/or configurations.

According to an embodiment, an electronic device (e.g., the electronic device 1001 of FIG. 10) may include a wearable device, and the wearable device may include, for example, a watch, (eye)glasses, earphones, a headset, a ring, a band, a patch, wearable clothes, and/or wearable shoes.

The sensor data 610 may be heart rate data as illustrated in FIG. 9. The electronic device 1001 (or a primary electronic device) may acquire sensor data from the ring, the band, and/or the watch which is a wearable device (or a secondary electronic device).

As illustrated, the electronic device 1001 may receive the sensor data 611 from the ring for a period from 12:00 am today to 6:00 am today. For example, from 12:00 am today to 6:00 am today, the ring which is a wearable device may have the highest priority. In addition, the electronic device 1001 may receive the sensor data 612 from the band for a period from 6 am today to 12 pm today. For example, as of 12:00 pm today, a priority of the band may become higher than that of the ring. This may be a case in which a wearable device (e.g., the secondary electronic device) for measuring biometric information by activating a sensor is changed. In this case, the ring may be a first electronic device, and the band may be a second electronic device.

The electronic device 1001 may receive the sensor data 612 from the band from 6:00 am today to 12:00 pm today, and may receive the sensor data 613 from the watch from 12:00 pm today to the present time. This may also be a case in which a wearable device (e.g., the secondary electronic device) for measuring biometric information by activating a sensor is changed. In this case, the band may be the first electronic device, and the watch may be the second electronic device.

The electronic device 1001 may correct sensor data received from the first electronic device (e.g., the band) and second electronic device (e.g., the watch) at the same point in time based on the reference data. For example, an interval in which the sensor data 612 received from the band and the sensor data 613 received from the watch overlap may be 10 minutes before and after 12 pm. For example, from 11:50 am to 12:10 pm, the electronic device 1001 may receive the sensor data from the band and the watch, respectively. The electronic device 1001 may correct the sensor data of the band and the watch acquired from 11:50 am to 12:10 pm, based on the reference data.

According to an embodiment, sensor data may be biased due to a deviation between a sensor included in a previous electronic device and a sensor included in a subsequent electronic device. Therefore, when connected in an overlapping interval, it is possible to provide seamless sensor data through the correction based on the reference data. For example, when a measurement-activated electronic device is changed from the band to the watch at 12:00 pm, the electronic device 1001 may continuously display sensor data on the sensor data output screen 600 as if the sensor data was acquired from a single wearable device through the correction.

When changing the measurement-activated electronic device, sensors included in electronic devices may measure accurate sensor data only after entering a stable state as a predetermined time elapses from the start of the measurement. Accordingly, an overlapping interval may be provided to end an operation of the sensor included in the previously activated electronic device only when the sensor included in the subsequently activated electronic device becomes able to stably perform the measurement. It is thus possible to continuously measure sensor data without disconnection as much as possible even though the sensor data is received from different electronic devices.

The processor 1020 may output a sensor data source through a display. The processor 1020 may output, through the display, device information about which wearable device acquires corresponding sensor data.

For example, the heart rate data source display area 630 may include a display area for displaying information associated with an electronic device acquiring heart rate data. For example, the heart rate data source display area 630 may include heart rate data at a specific time and/or a specific time period and information associated with an electronic device measuring the heart rate data. For example, the heart rate data source display area 630 may display sensor data acquired from the watch. As described above, users may thereby easily identify which wearable device acquired corresponding sensor data.

Figure 10:
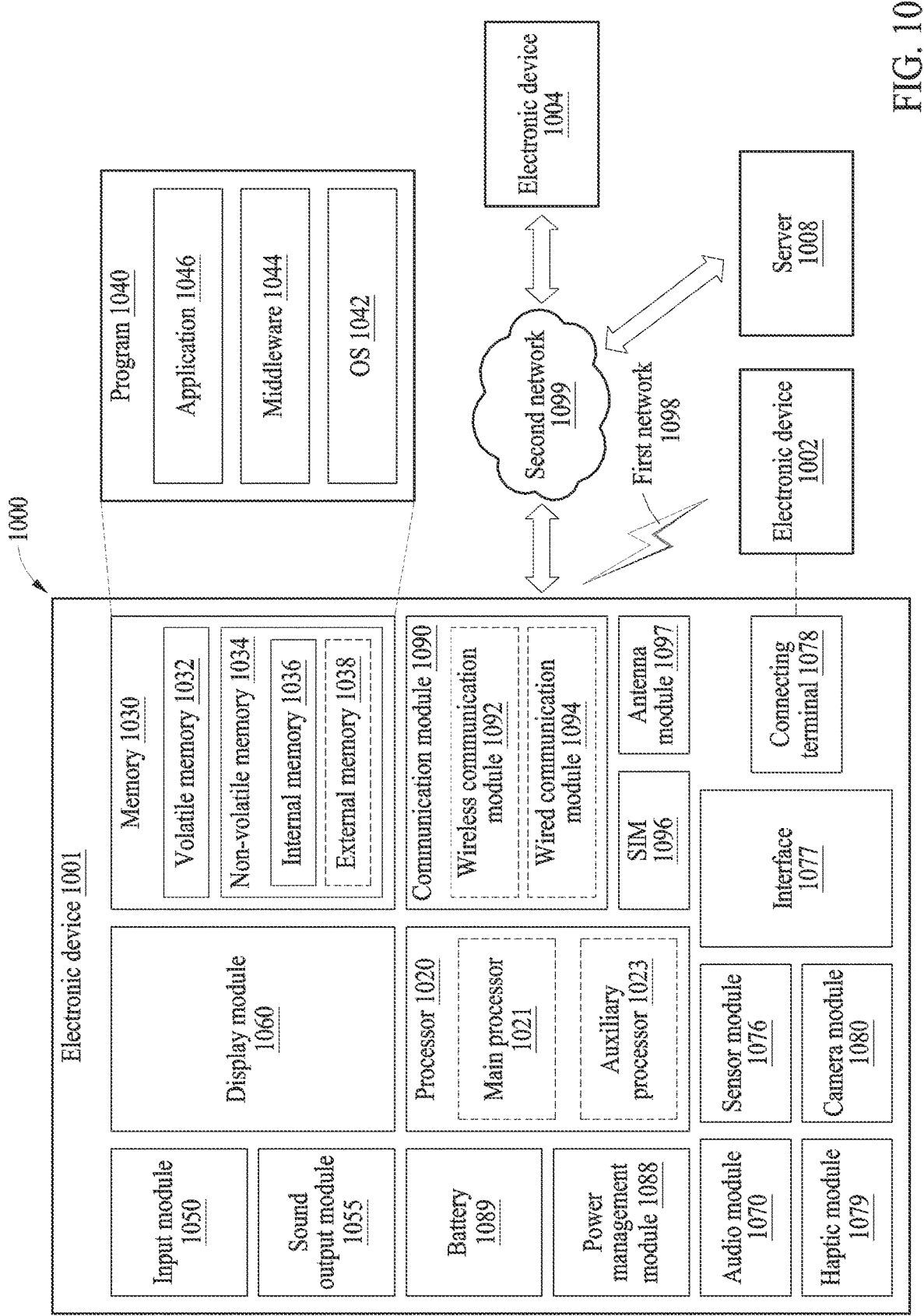
FIG. 10 is a block diagram illustrating an example of an electronic device in a network environment according to an embodiment.

FIG. 10 is a block diagram illustrating an electronic device in a network environment according to an embodiment.

Referring to FIG. 10, in an embodiment, an electronic device 1001 in a network environment 1000 may communicate with an electronic device 1002 via a first network 1098 (e.g., a short-range wireless communication network), or communicate with at least one selected from an external electronic device 1004 and a server 1008 via a second network 1099 (e.g., a long-range wireless communication network). The electronic device 1001 may communicate with the external electronic device 1004 via the server 1008. The electronic device 1001 includes a processor 1020, a memory 1030, an input module 1050, a sound output module 1055, a display module 1060, an audio module 1070, and a sensor module 1076, an interface 1077, a connecting terminal 1078, a haptic module 1079, a camera module 1080, a power management module 1088, a battery 1089, a communication module 1090, a subscriber identification module (SIM) 1096, or an antenna module 1097. At least one (e.g., the connecting terminal 1078) selected from the above components may be omitted from the electronic device 1001, or one or more other components may be added in the electronic device 1001. Some of the components (e.g., the sensor module 1076, the camera module 1080, or the antenna module 1097) may be integrated as a single component (e.g., the display module 1060).

The processor 1020 may execute, for example, software (e.g., a program 1040) to control at least one other component (e.g., a hardware or software component) of the electronic device 1001 connected to the processor 1020, and may perform various data processing or computation. As at least a part of data processing or computation, the processor 1020 may store a command or data received from another component (e.g., the sensor module 1076 or the communication module 1090) in a volatile memory 1032, process the command or data stored in the volatile memory 1032, and store resulting data in a non-volatile memory 1034. The processor 1020 includes a main processor 1021 (e.g., a central processing unit (CPU) or an application processor (AP)) or an auxiliary processor 1023 (e.g., a graphics processing unit (GPU), a neural processing unit (NPU), an image signal processor (ISP), a sensor hub processor, or a communication processor (CP)) that is operable independently of, or in conjunction with, the main processor 1021. In an embodiment, for example, when the electronic device 1001 includes the main processor 1021 and the auxiliary processor 1023, the auxiliary processor 1023 may be adapted to consume less power than the main processor 1021 or to be specific to a specified function. The auxiliary processor 1023 may be implemented separately from the main processor 1021 or as a part of the main processor 1021.

The auxiliary processor 1023 may control at least some of functions or states related to at least one (e.g., the display module 1060, the sensor module 1076, or the communication module 1090) selected from the components of the electronic device 1001, instead of the main processor 1021 while the main processor 1021 is in an inactive (e.g., sleep)

state or along with the main processor 1021 while the main processor 1021 is an active state (e.g., executing an application). The auxiliary processor 1023 (e.g., an ISP or a CP) may be implemented as a portion of another component (e.g., the camera module 1080 or the communication module 1090) that is functionally related to the auxiliary processor 1023. The auxiliary processor 1023 (e.g., an NPU) may include a hardware structure specified for artificial intelligence (AI) model processing. An AI model may be generated by machine learning. Such learning may be performed by, for example, the electronic device 1001 in which the AI model is performed, or performed via a separate server (e.g., the server 1008). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may additionally or alternatively include a software structure other than the hardware structure.

The memory 1030 may store various data used by at least one component (e.g., the processor 1020 or the sensor module 1076) of the electronic device 1001. The data may include, for example, software (e.g., the program 1040) and input data or output data for a command related thereto. The memory 1030 includes the volatile memory 1032 or the non-volatile memory 1034. The non-volatile memory 1034 includes an internal memory 1036 and an external memory 1038.

The program 1040 may be stored as software in the memory 1030, and includes, for example, an operating system (OS) 1042, middleware 1044, or an application 1046.

The input module 1050 may receive a command or data to be used by another component (e.g., the processor 1020) of the electronic device 1001, from the outside (e.g., a user) of the electronic device 1001. The input module 1050 may include, for example, a microphone, a mouse, a keyboard, a key (e.g., a button), or a digital pen (e.g., a stylus pen).

The sound output module 1055 may output a sound signal to the outside of the electronic device 1001. The sound output module 1055 may include, for example, a speaker or a receiver. The speaker may be used for general purposes, such as playing multimedia or playing records. The receiver may be used to receive an incoming call. The receiver may be implemented separately from the speaker or as a part of the speaker.

The display module 1060 may visually provide information to the outside (e.g., a user) of the electronic device 1001. The display module 1060 may include, for example, a display, a hologram device, or a projector, and a control circuitry to control a corresponding one of the display, the hologram device, and the projector. The display module 1060 may include a touch sensor adapted to sense a touch, or a pressure sensor adapted to measure an intensity of a force incurred by the touch.

The audio module 1070 may convert a sound into an electric signal or vice versa. The audio module 1070 may obtain the sound via the input module 1050 or output the sound via the sound output module 1055 or an external electronic device (e.g., the electronic device 1002 such as a speaker or a headphone) directly or wirelessly connected to the electronic device 1001.

The sensor module 1076 may detect an operational state (e.g., power or temperature) of the electronic device 1001 or an environmental state (e.g., a state of a user) external to the electronic device 1001, and generate an electric signal or data value corresponding to the detected state. The sensor module 1076 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1077 may support one or more specified protocols to be used for the electronic device 1001 to be coupled with an external electronic device (e.g., the electronic device 1002) directly (e.g., by wire) or wirelessly. The interface 1077 may include, for example, a high-definition multimedia interface (HDMI), a universal serial bus (USB) interface, a secure digital (SD) card interface, or an audio interface.

The connecting terminal 1078 may include a connector via which the electronic device 1001 may be physically connected to an external electronic device (e.g., the electronic device 1002). The connecting terminal 1078 may include, for example, an HDMI connector, a USB connector, an SD card connector, or an audio connector (e.g., a headphone connector).

The haptic module 1079 may convert an electric signal into a mechanical stimulus (e.g., a vibration or a movement) or an electrical stimulus which may be recognized by a user via his or her tactile sensation or kinesthetic sensation. The haptic module 1079 may include, for example, a motor, a piezoelectric element, or an electric stimulator.

The camera module 1080 may capture a still image and moving images. The camera module 1080 may include one or more lenses, image sensors, ISPs, or flashes.

The power management module 1088 may manage power supplied to the electronic device 1001. The power management module 1088 may be implemented as, for example, at least a part of a power management integrated circuit (PMIC).

The battery 1089 may supply power to at least one component of the electronic device 1001. The battery 1089 may include, for example, a primary cell which is not rechargeable, a secondary cell which is rechargeable, or a fuel cell.

The communication module 1090 may support establishing a direct (e.g., wired) communication channel or a wireless communication channel between the electronic device 1001 and an external electronic device (e.g., the electronic device 1002, the external electronic device 1004, or the server 1008) and performing communication via the established communication channel. The communication module 1090 may include one or more communication processors that are operable independently of the processor 1020 (e.g., an AP) and that support direct (e.g., wired) communication or wireless communication. The communication module 1090 may include a wireless communication module 1092 (e.g., a cellular communication module, a short-range wireless communication module, or a global navigation satellite system (GNSS) communication module) or a wired communication module 1094 (e.g., a local area network (LAN) communication module or a power line communication (PLC) module). A corresponding one of these communication modules may communicate with the external electronic device 1004 via the first network 1098 (e.g., a short-range communication network, such as Bluetooth™, wireless-fidelity (Wi-Fi) direct, or infrared data association (IrDA)) or the second network 1099 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multiple components (e.g., multi chips) separate from each other. The wireless communication module 1092 may identify and authenticate the electronic device 1001 in a communication network, such as the first network 1098 or the second network 1099, using subscriber information (e.g., international mobile subscriber identity (IMSI)) stored in the SIM 1096.

The wireless communication module 1092 may support a 5G network after a 4G network, and a next-generation communication technology, e.g., a new radio (NR) access technology. The NR access technology may support enhanced mobile broadband (eMBB), massive machine type communications (mMTC), or ultra-reliable and low-latency communications (URLLC). The wireless communication module 1092 may support a high-frequency band (e.g., a mmWave band) to achieve, e.g., a high data transmission rate. The wireless communication module 1092 may support various technologies for securing performance on a high-frequency band, such as, e.g., beamforming, massive multiple-input and multiple-output (MIMO), full dimensional MIMO (FD-MIMO), an array antenna, analog beamforming, or a large-scale antenna. The wireless communication module 1092 may support various requirements specified in the electronic device 1001, an external electronic device (e.g., the external electronic device 1004), or a network system (e.g., the second network 1099). The wireless communication module 1092 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1097 may transmit or receive a signal or power to or from the outside (e.g., an external electronic device) of the electronic device 1001. The antenna module 1097 may include an antenna including a radiating element including a conductive material or a conductive pattern formed in or on a substrate (e.g., a printed circuit board (PCB)). The antenna module 1097 may include a plurality of antennas (e.g., array antennas). In such an embodiment, at least one antenna appropriate for a communication scheme used in a communication network, such as the first network 1098 or the second network 1099, may be selected by, for example, the communication module 1090 from the plurality of antennas. The signal or the power may be transmitted or received between the communication module 1090 and the external electronic device via the at least one selected antenna. Another component (e.g., a radio frequency integrated circuit (RFIC)) other than the radiating element may be additionally formed as or defined by a part of the antenna module 1097.

The antenna module 1097 may form a mmWave antenna module. The mmWave antenna module may include a PCB, an RFIC disposed on a first surface (e.g., a bottom surface) of the PCB or adjacent to the first surface and capable of supporting a designated high-frequency band (e.g., the mmWave band), and a plurality of antennas (e.g., array antennas) disposed on a second surface (e.g., a top or a side surface) of the PCB or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general-purpose input and output (GPIO), serial peripheral interface (SPI), or mobile industry processor interface (MIPI)).

Commands or data may be transmitted or received between the electronic device 1001 and the external electronic device 1004 via the server 1008 coupled with the second network 1099. Each of the external electronic devices 1002 and 1004 may be a device of the same type as or a different type from the electronic device 1001. All or some of operations to be executed by the electronic device 1001 may be executed at one or more of (or at least one selected from) the external electronic devices 1002, 1004, and 1008. In an embodiment, for example, if the electronic device 1001 is desired to perform a function or a service automatically, or in response to a request from a user or another device, the electronic device 1001, instead of, or in addition to, executing the function or the service, may request one or more external electronic devices to perform at least a part of the function or the service. The one or more external electronic devices receiving the request may perform the at least part of the function or the service requested, or an additional function or an additional service related to the request, and may transfer an outcome of the performing to the electronic device 1001. The electronic device 1001 may provide the outcome, with or without further processing of the outcome, as at least a part of a reply to the request. To that end, a cloud computing, distributed computing, mobile edge computing (MEC), or client-server computing technology may be used, for example. The electronic device 1001 may provide ultra-low latency services using, e.g., distributed computing or mobile edge computing. In an embodiment, for example, the external electronic device 1004 may include an Internet-of-things (IoT) device. The server 1008 may be an intelligent server using machine learning and/or a neural network. The external electronic device 1004 or the server 1008 may be included in the second network 1099. The electronic device 1001 may be applied to intelligent services (e.g., smart home, smart city, smart car, or healthcare) based on 5G communication technology or IoT-related technology.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

What is claimed is:

1. A sensor data acquisition method using a plurality of electronic devices, comprising:
    receiving sample sensor data from each of the electronic devices for each predetermined period;
    generating reference data based on the sample sensor data, wherein the reference data comprises data generated based on a common characteristic of a plurality of pieces of the sample sensor data received from two or more of the electronic devices;

generating a measurement accuracy of each of the electronic devices for each predetermined period based on a comparison between the sample sensor data and the reference data;

updating a priority information of each of the electronic devices for each predetermined period based on at least one of the measurement accuracy or state information of each of the electronic devices;

changing a measurement-activated electronic device to another electronic device based on a corresponding priority information updated in each predetermined period, wherein the changing comprising:

transmitting a measurement activating signal to a second electronic device different from a first electronic device at a first time point, wherein the first electronic device was the measurement-activated electronic device;

transmitting a measurement deactivating signal to the first electronic device at a second time point; and correcting overlapped sensor data, received from the first electronic device and the second electronic device at an overlapping interval between the first time point and the second time point, based on the reference data; and receiving sensor data from the measurement-activated electronic device for a time unit of a corresponding predetermined period.

2. The sensor data acquisition method of claim 1, wherein the generating of the reference data comprises:
normalizing the sample sensor data; and
generating the reference data based on an average value of the normalized sample sensor data.

3. The sensor data acquisition method of claim 2, wherein the normalizing of the sample sensor data comprises at least one of:
removing noise from the sample sensor data;
removing an irregular pattern from the sample sensor data; or
removing outlier data from the sample sensor data.

4. The sensor data acquisition method of claim 1, wherein the generating the measurement accuracy comprises:
generating the measurement accuracy based on a similarity between the sample sensor data corresponding to each of the electronic devices and the reference data.

5. The sensor data acquisition method of claim 1, wherein the generating the measurement accuracy comprises:
generating the measurement accuracy based on at least one of an average similarity, a maximum similarity, a minimum similarity, and a repetitive period similarity between the sample sensor data corresponding to each of the electronic devices and the reference data.

6. The sensor data acquisition method of claim 1, further comprising:
after determining of the priority information for each predetermined period, updating a priority queue based on the priority information for each predetermined period.

7. The sensor data acquisition method of claim 6, wherein the priority queue comprises a binary tree in which a priority of an electronic device corresponding to a parent node is greater than a priority of an electronic device corresponding to a child node.

8. The sensor data acquisition method of claim 6, further comprising:
determining, as the measurement-activated electronic device, an electronic device corresponding to a root node of the priority queue.

9. The sensor data acquisition method of claim 1, wherein the generating of the reference data comprises:
generating the reference data based on three-dimensional (3D) sample sensor data acquired from motion detection sensors respectively comprised in the electronic devices positioned at different body parts of a user.

10. The sensor data acquisition method of claim 9, wherein the generating of the reference data comprises:
transforming, into a reference dimension, each of the 3D sample sensor data acquired from the different body parts of the user; and
generating the reference data based on the 3D sample sensor data transformed into the reference dimension.

11. The sensor data acquisition method of claim 9, wherein the generating the measurement accuracy for each predetermined period comprises:
transforming each 3D sample sensor data into a reference dimension; and
generating the measurement accuracy based on a similarity between the 3D sample sensor data of the reference dimension and the reference data.

12. A non-transitory computer-readable storage medium storing instructions that, when executed by a processor, cause the processor to perform the sensor data acquisition method of claim 1.

13. An electronic device, comprising:
a processor configured to:
receive sample sensor data from each of a plurality of electronic devices for each predetermined period;
generate reference data based on the sample sensor data, wherein the reference data comprises data generated based on a common characteristic of a plurality of pieces of the sample sensor data received from two or more of the electronic devices;
generate a measurement accuracy of each of the electronic devices for each predetermined period based on a comparison between the sample sensor data and the reference data;
update a priority information of each of the electronic devices for each predetermined period based on at least one of the measurement accuracy or state information of each of the electronic devices;
change a measurement-activated electronic device to another electronic device based on a corresponding priority information updated in each predetermined period, wherein the change comprises:
transmit a measurement activating signal to a second electronic device different from a first electronic device at a first time point, wherein the first electronic device was the measurement-activated electronic device;
transmit a measurement deactivating signal to the first electronic device at a second time point; and
correct overlapped sensor data, received from the first electronic device and the second electronic device at an overlapping interval between the first time point and the second time point, based on the reference data; and
receive sensor data from the measurement-activated electronic device for a time unit of a corresponding predetermined period.

14. The electronic device of claim 13, wherein generation of the reference data comprises:
normalize the sample sensor data by performing at least one of: remove noise from the sample sensor data, remove an irregular pattern from the sample sensor data, or remove outlier data from the sample sensor data; and generate the reference data based on an average value of the normalized sample sensor data.

15. The electronic device of claim 13, wherein generation of the reference data comprises:

generate the reference data based on three-dimensional (3D) sample sensor data acquired from motion detection sensors respectively comprised in the electronic devices positioned at different body parts of a user;

transform, into a reference dimension, each of the 3D sample sensor data acquired from the different body parts of the user; and generate the reference data based on the 3D sample sensor data transformed into the reference dimension.

* * * * *